UNITED STATES PATENT OFFICE.

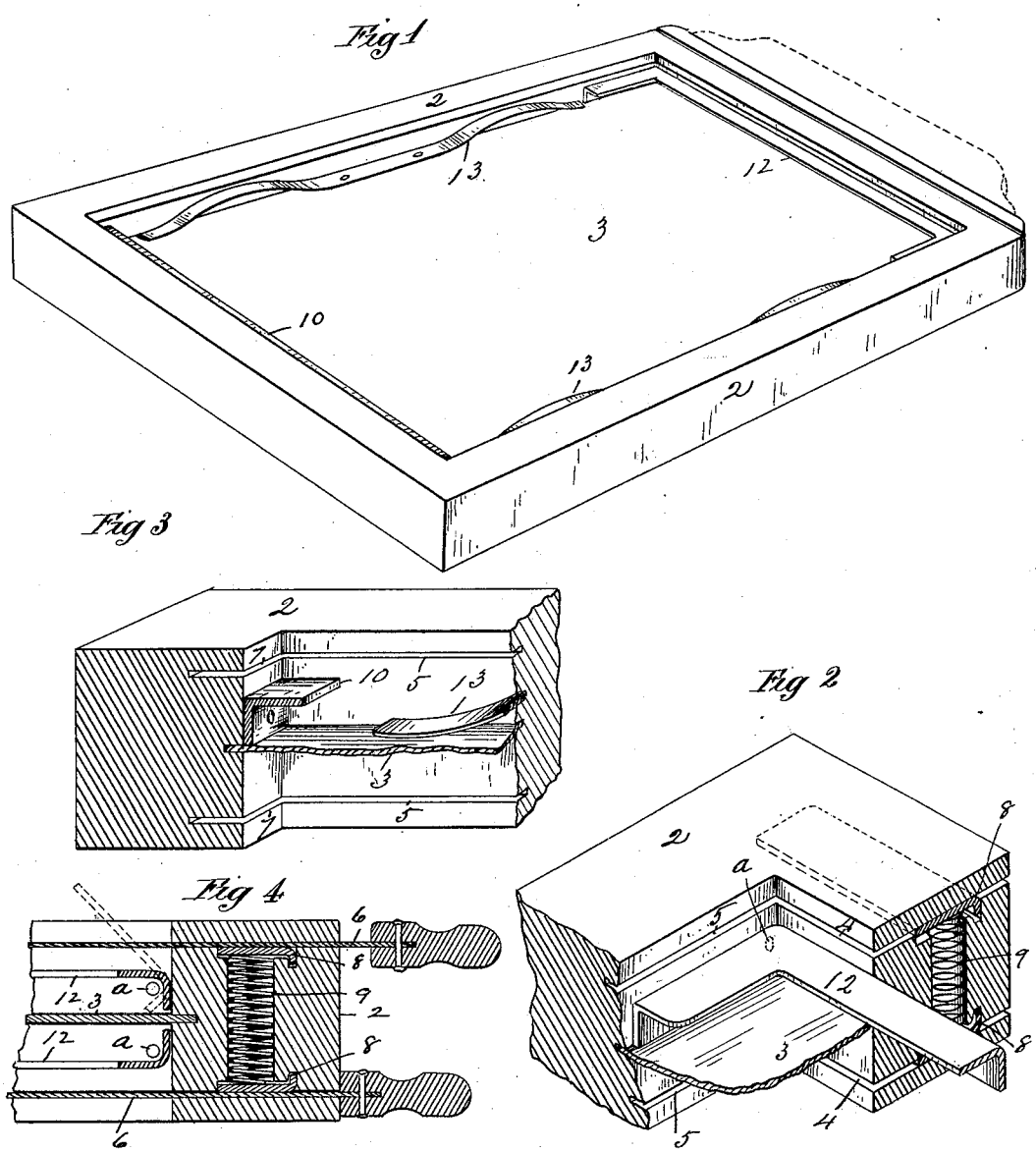

MILAN P. WARNER, OF HOLYOKE, MASSACHUSETTS.

PHOTOGRAPHIC-PLATE HOLDER.

SPECIFICATION forming part of Letters Patent No. 367,480, dated August 2, 1887.

Application filed March 21, 1887. Serial No. 231,628. (No model.)

*To all whom it may concern:*

Be it known that I, MILAN P. WARNER, a citizen of the United States, residing at Holyoke, in the county of Hampden and State of Massachusetts, have invented new and useful Improvements in Photographic-Plate Holders, of which the following is a specification.

This invention relates to improvements in dry-plate holders for photographic cameras, the object being to provide an improved plate-holder to retain plates in position in a camera and to protect them from the light after the holder is removed from the latter; and the invention consists in the peculiar construction and arrangement of the plate-holder, as hereinafter fully described, and set forth in the claims.

In the drawings forming part of this specification, Figure 1 is a perspective view of a plate-holder embodying my improvements, the slides thereof being removed, said figure showing in dotted lines the outlines of one of the heads of a slide. Fig. 2 is a perspective view, partly in section, of one corner of the head of the frame. Fig. 3 is a like view of one corner of the lower end of the frame. Fig. 4 is a transverse section of the head end of the holder and its slides.

In the drawings, 2 indicates the frame of the plate-holder, which is constructed of wood or other similar material, of rectangular form and of such dimensions as may be required for the photographic plates which it is to hold. Said frame is provided with a thin metallic or other diaphragm, 3, secured therein in suitable grooves in the frame, as shown in Figs. 2, 3, and 4, located about centrally between the opposite sides of the frame and constituting a close partition separating one side of the frame or plate-holder from the other, thereby forming in each side of the latter a recess to receive a prepared photographic plate, which after having been exposed in a camera in the usual manner becomes what is termed a "negative."

The frame 2 of the plate-holder has two slots, 4, through the upper or head end thereof, corresponding in position with the ends of two longitudinal grooves, 5, in the inner opposite sides of said frame on the opposite sides of the diaphragm 3, said slots and grooves being provided for the reception of two slide-plates, 6, (see Fig. 4,) made preferably of thin metal, having suitable heads or handles on one end thereof, as shown, said plates 6 each forming when pushed into said frame one side of a close dark chamber for the reception of a negative plate, one end of said slide-plate entering a groove, 7, in the inner side of the lower end of the frame. (See Fig. 3.) By means of the said grooves 5 and 7 in the frame 2, which entirely incloses the borders of the slide-plate 6 when the latter is in position in the frame to cover a negative plate, the entrance of any light into the said dark plate-chamber in the holder is wholly prevented.

The aforesaid slots 4 in the end of the frame 2 are provided with automatically-operating devices for cutting off any light that otherwise might enter the aforesaid plate-chamber in the holder when either one of the slides 6 is withdrawn from the holder for the purpose of inserting or removing a negative plate; and said light-obstructing devices are constructed and operate as follows:

Referring to Figs. 2 and 4, which show the end of the frame in section, through which the slides 6 enter, a metallic strip, 8, having one edge (the one toward the end of the frame) curved or bent over, as shown, is let into the end of the frame in a suitably-formed groove at the side of each of said slots 4, and said strip extends quite across the end of the frame and sufficiently far to prevent light from entering through the slot 4 at any point, as indicated by dotted lines in Fig. 2. A suitable spring, as 9, coiled or otherwise, is placed within the frame near each end of the said metallic strip 8, and has such a bearing against the latter as to hold it closely against the slide 6 when the latter is in the holder, and when said slide is withdrawn quite out of the latter the springs under said strip 8 carry said strip quite across the said slot 4, and thereby said strip serves to prevent any light from passing through the slot 4, as aforesaid. Any suitable number of springs 9 may be employed to operate the strip 8, as described. In the drawings one spring is shown between the two light-obstructing strips 8, having a bearing upon both, and in a plate-holder constructed with two slides and two plate-chambers said spring arrangement is the most convenient.

For the purpose of securing and holding the aforesaid glass negative plates in the plate-holder, a metallic angle-strip, 10, is secured across the lower end of the frame 2, about midway between the diaphragm 3 and the slide-groove 5, and at the opposite end of the frame 2 a second metallic angle strip, 12, is pivotally attached to said frame by suitable pins, which pass through near the corners thereof at $a$, (see Figs. 1, 2, and 4, the latter figure showing in dotted lines the position of the upturned end of said angle-strip 12,) whereby, by grasping the ends of said angle-strip, which are bent at right angles to that part thereof which extends across the end of the frame 2, said strip 12 may be rocked on its pivot-pins to swing the edge thereof which extends horizontally over the diaphragm 3 upward or away from the diaphragm, to permit of putting a plate into the holder and to provide for securing one end of the plate afterward. The said angle-strip 12 is in practice fitted to swing with a slight frictional resistance between the borders of the frame 2 in order to cause it to maintain its position, whether it be swung over the end of a negative plate, as below described, or upward, as shown in dotted lines in Fig. 4.

A flat curved spring, 13, is secured on the diaphragm 3 near its opposite edges, as shown, upon which the negative plate lies when in the holder, and whereby said plate is held in such a way as to prevent it from moving endwise.

From the above description of the plate-holder herein referred to, and from its construction, as illustrated in the drawings, it should be understood that the plate-holding devices on each side of the diaphragm 3, when the plate-holder is made in double form, as shown, are identical in their construction, and hence a description of those pertaining to one side of the holder applies to those on the other side thereof.

In putting a negative plate into the holder the angle-strip 12 is grasped by its aforesaid corner extensions and is turned on its pivots to cause the edge thereof, which projects over the diaphragm, to assume a position substantially at right angles to the latter. A negative plate is then taken, and one end being placed under the angle-strip 10, its opposite end is pressed downward against the action of the springs 13 to a proper position, and the angle-strip 12 is then swung back to the position shown in Figs. 1 and 2, whereby one of its borders is brought against the end and a portion of the opposite edges of the negative plate, and thereby the latter is held in a proper position in the holder to be acted on by a camera, and the slide 6 is then pushed into the frame over the plate, ready to be withdrawn when the photographing operation takes place. One edge of said strip 8 is curved to facilitate the entrance of the end of the slide 6 into the slot 4.

What I claim as my invention is—

1. A photographic negative-plate holder consisting of a frame, substantially as described, having a plate-chamber on one or both sides thereof, a slide-plate to be moved through a slot in one end of said frame and within grooves in the inner borders of the latter to close one side of said chamber, and a plate-engaging angle-strip, as 10, fixed across one end of said chamber, having one of its borders extending horizontally, a second plate-engaging angle-strip, as 12, pivoted to the frame at the opposite end of said chamber, and suitable plate-springs, as 13, on which said negative plate rests, substantially as set forth.

2. The frame 2, having the slots 4 in one end, a light-obstructing strip, 8, having one edge curved and let into a groove at the side of each of said slots, and a spring between said strips to force the latter apart, substantially as set forth.

MILAN P. WARNER.

Witnesses:
H. A. CHAPIN,
G. M. CHAMBERLAIN.